July 2, 1963   R. A. ANDREWS   3,095,805
PINEAPPLE JUICE EXTRACTING MACHINE
Filed Oct. 20, 1958   5 Sheets-Sheet 1

INVENTOR.
RICHARD A. ANDREWS
BY
Lyon & Lyon
ATTORNEYS

INVENTOR.
RICHARD A. ANDREWS
BY
Lyon & Lyon
ATTORNEYS

July 2, 1963  R. A. ANDREWS  3,095,805
PINEAPPLE JUICE EXTRACTING MACHINE
Filed Oct. 20, 1958  5 Sheets-Sheet 3

INVENTOR.
RICHARD A. ANDREWS
BY
Lyon & Lyon
ATTORNEYS

July 2, 1963   R. A. ANDREWS   3,095,805
PINEAPPLE JUICE EXTRACTING MACHINE
Filed Oct. 20, 1958   5 Sheets-Sheet 4

INVENTOR.
RICHARD A. ANDREWS
BY Lyon Lyon
ATTORNEYS

July 2, 1963 R. A. ANDREWS 3,095,805
PINEAPPLE JUICE EXTRACTING MACHINE
Filed Oct. 20, 1958 5 Sheets-Sheet 5
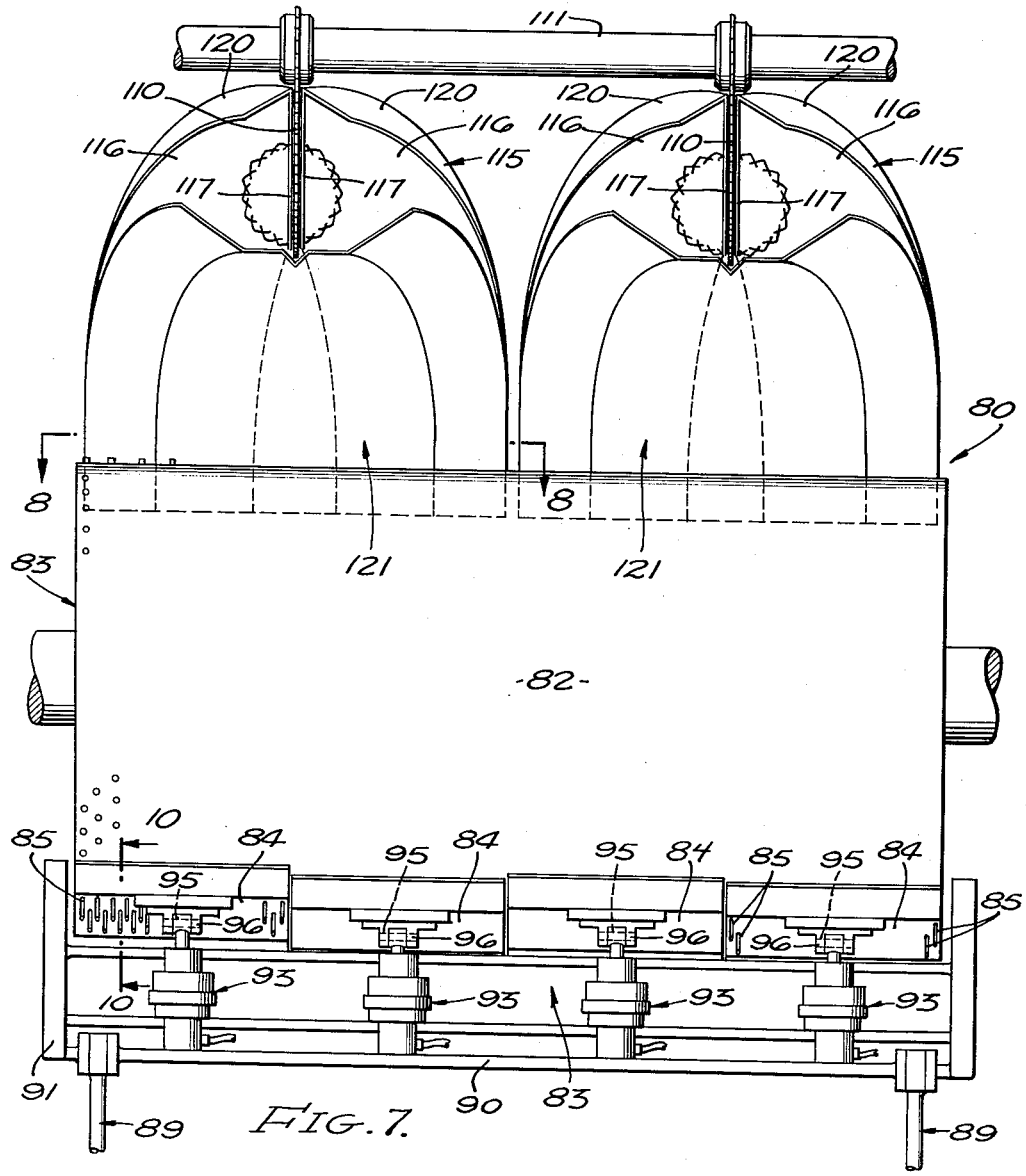
FIG. 7.
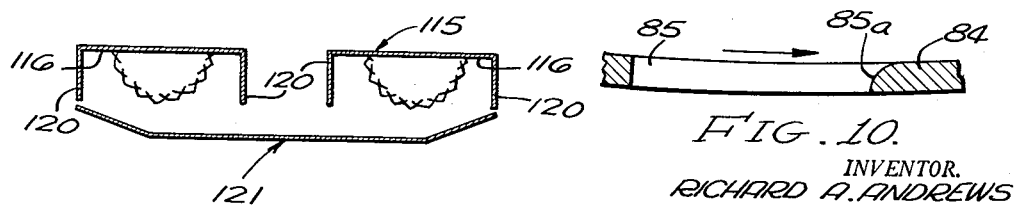
FIG. 8.
FIG. 10.
INVENTOR.
RICHARD A. ANDREWS
BY Lyon & Lyon
ATTORNEYS

United States Patent Office 3,095,805
Patented July 2, 1963

3,095,805
PINEAPPLE JUICE EXTRACTING MACHINE
Richard A. Andrews, Whittier, Calif., assignor to Citrus Equipment Corporation, Whittier, Calif., a corporation of California
Filed Oct. 20, 1958, Ser. No. 768,155
6 Claims. (Cl. 100—97)

This invention relates to the extraction of fruit juices and has particular reference to a process and apparatus for the extraction of juice from pineapples.

The juice or combined pulp and juice from the pineapple has long been known as a healthful and delicious beverage. Heretofore, however, the juice has been commercially obtained only as a by-product from the processes of producing sliced, chunk or crushed canned pineapple. The demand for the juice has far exceeded the capacity to produce the juice as a by-product from these operations and hence many attempts have been made to provide a means for extraction of pineapple juice from the fruit as the primary product. These attempts have heretofore not been entirely successful, due primarily, it is believed, to the peculiar nature and characteristics of the pineapple fruit, with its hard, thorny, irregular skin, its non-spherical shape and the fact that the fruit varies widely in size.

One of the primary objects of the present invention is, therefore, to provide a commercially practicable apparatus for the extraction of the juice from the pineapple fruit.

Another object of this invention is to provide a novel pineapple juice extracting machine which is capable of operating at high speeds to automatically extract high yields of juice from whole pineapples while maintaining the quality of the juice at a high level.

A further object of the present invention is to provide a pineapple juice extracting machine embodying a novel fruit orienter and feeder mechanism.

Other objects and advantages of the present invention, it is believed, will be readily apparent from the following detailed description of a preferred embodiment thereof when read in connection with the accompanying drawings.

In the drawings:

FIGURE 5a is a view similar to FIGURE 5, but illustrating the fruit in a different position of mis-alignment.

FIGURE 7 is a sectional elevation taken substantially on the line 7—7 of FIGURE 3.

FIGURE 8 is a sectional elevation taken substantially on the line 8—8 of FIGURE 7.

FIGURE 9 is a sectional elevation taken substantially on the line 9—9 of FIGURE 1.

FIGURE 10 is a sectional elevation, on an enlarged scale, taken substantially on the line 10—10 of FIGURE 7.

Figure 1:
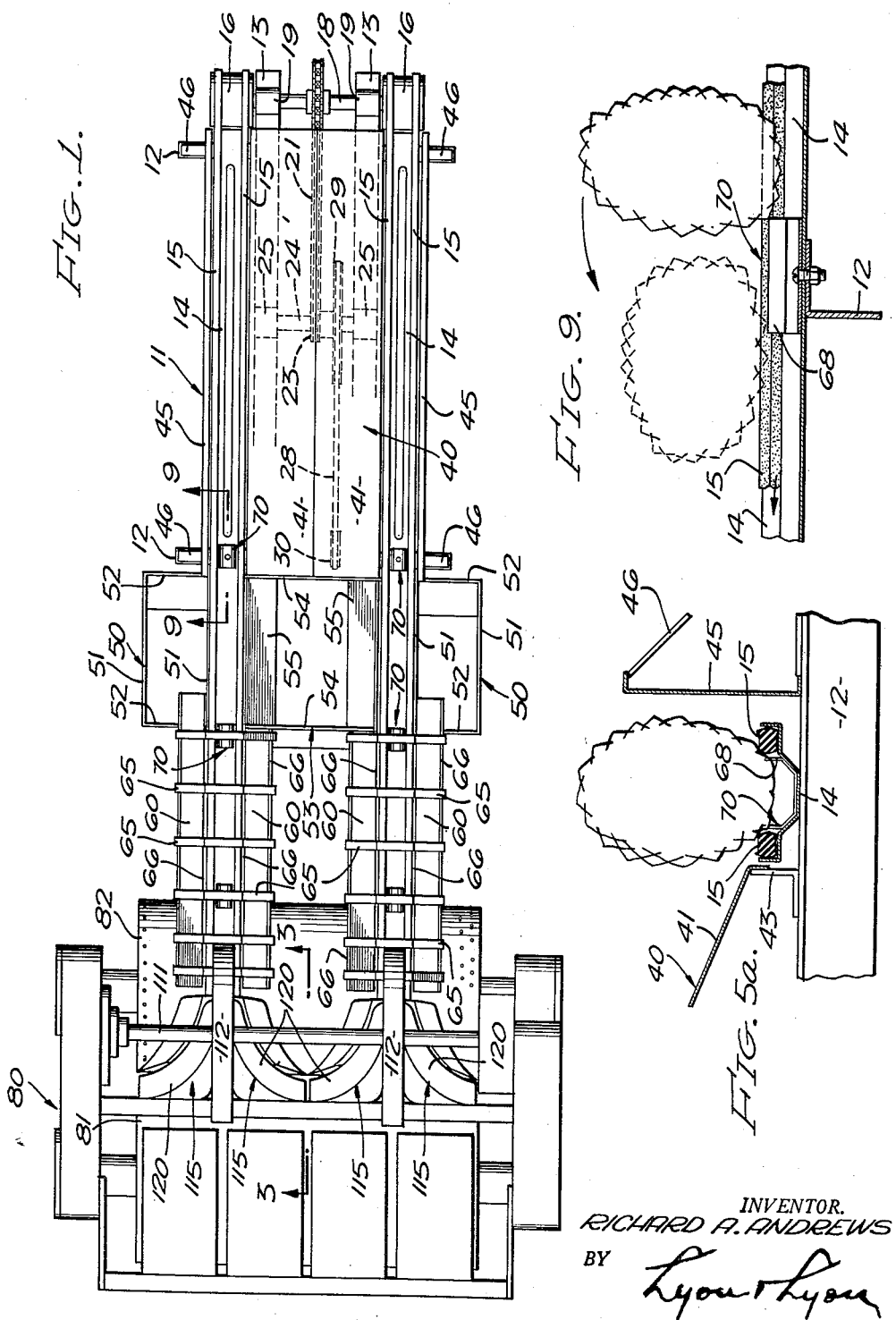
FIGURE 1 is a top plan view of a preferred form of pineapple juice extracting machine embodying the present invention.
Figure 2:
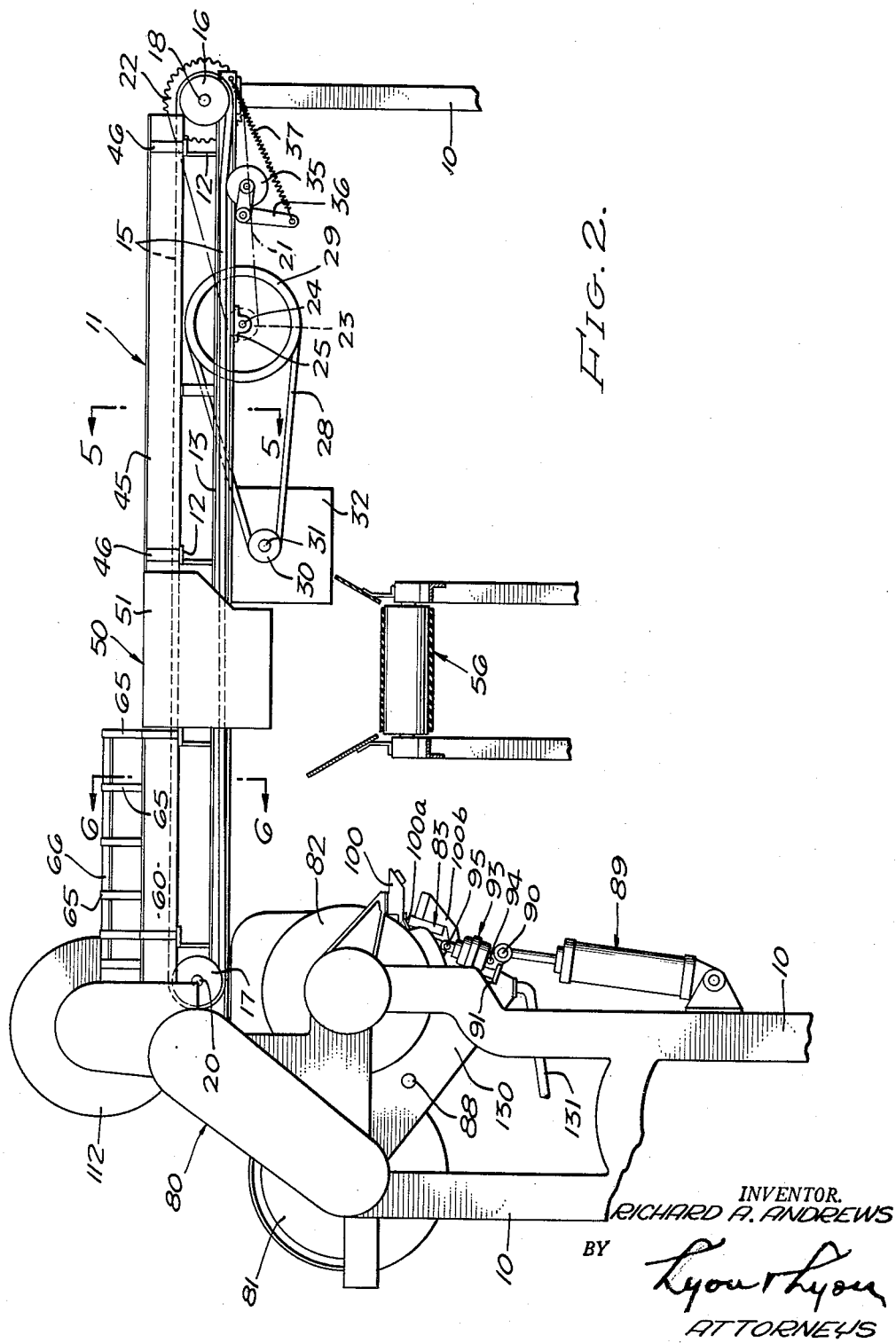
FIGURE 2 is a side elevation of the machine.
Figure 3:
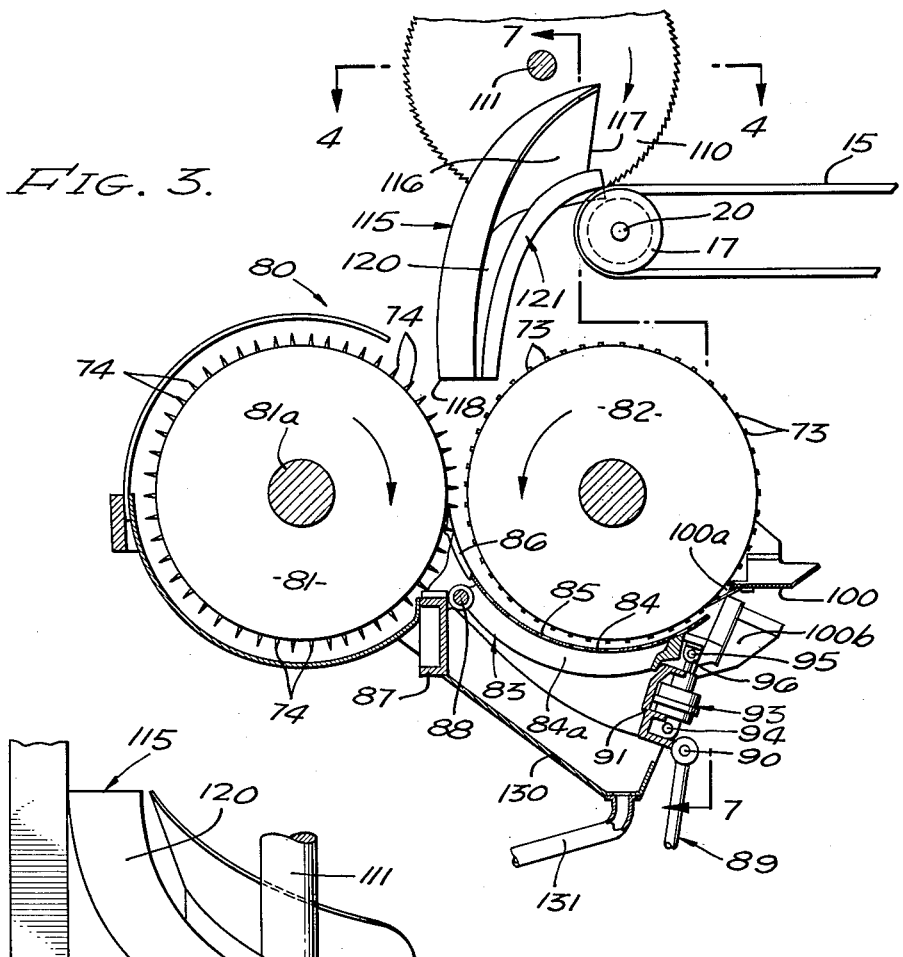
FIGURE 3 is a sectional elevation taken substantially on the line 3—3 of FIGURE 1.
Figure 4:
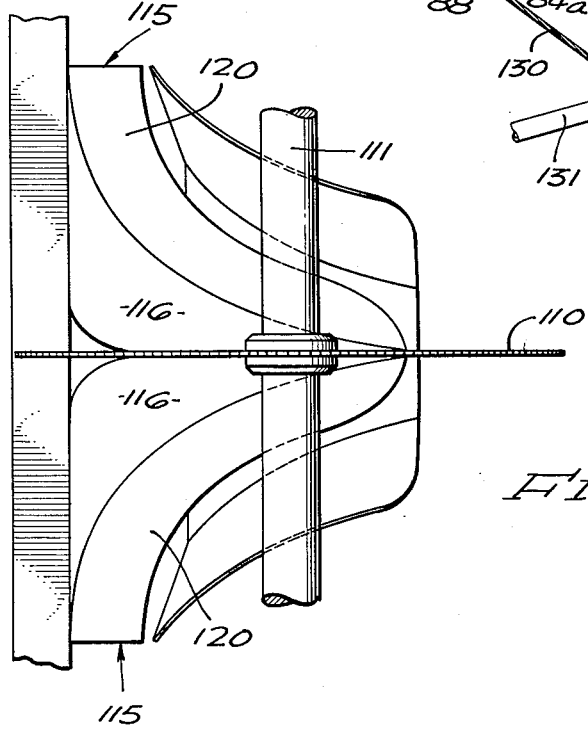
FIGURE 4 is a sectional elevation taken substantially on the line 4—4 of FIGURE 3.

Briefly, the apparatus of the present invention includes a fruit orienting and feeding mechanism which orients the fruit with its long axis extending generally parallel to the direction of feed, and which delivers the oriented whole fruit to the extracting mechanism per se. This mechanism includes means for severing the whole fruit into halves along a cleavage plane parallel to or coincident with the long axis or core of the fruit, and means for directing the fruit into the bite between a pair of spaced rotatable rollers or drums. These latter means include a pair, or sets of pairs, of curved divider plates which separate the two fruit halves and cause the fruit halves to be rotated from the initial position, wherein the longitudinal axes thereof are generally horizontal, to the position for delivery into the bite between the drums, wherein the longitudinal axes of the fruit are generally vertical. The fruit halves are conveyed by one of the drums through a converging passage formed by the conveying drum and a curved grid structure, the cut faces of the fruit halves contacting the inner surface of the grid so that the fruit is gradually compressed and at the same time subjected to a shearing action, forcing the juice and juice bearing pulp into and through the openings in the grid, thereby extracting substantially all of the juice and edible pulp from the fruit in liquid or slurry form, leaving only the peel which is forced out the discharge end of the converging passage.

Some pineapples, particularly the smaller sizes, do not have the characteristic elongated shape, but are substantially spherical. Such fruit do not require orienting and the cutting plane may be at any angle to the core of the fruit.

Referring now to the drawings, the apparatus of the present invention is supported upon a plurality of leg members 10 and includes a fruit orienter and feeder assembly generally indicated 11. This assembly includes horizontal transverse and longitudinal frame members 12 and 13 which support a pair of track members 14, each of which guides a pair of rubber or rubber-like, spaced conveyor belts 15 which extend longitudinally of the assembly between a pair of pulleys 16 and 17, the pulley 16 being carried on a shaft 18 journalled in suitable bearings 19 at the forward end of the assembly and the pulley 17 being carried on an idler shaft 20 at the rearward end of the assembly.

Means are provided for driving the conveyor belts with the upper runs thereof moving in the rearward direction and, as shown in the drawings, these means may include a chain transmission 21 extending between a sprocket 22 on the shaft 18 and a sprocket 23 on a cross-shaft 24 journalled in suitable bearings 25 secured to the longitudinal frame members 13. The shaft 24 is driven in turn by means of a belt 28 extending between a pulley 29 on the shaft 24 and a pulley 30 on the drive shaft 31 of a motor-driven gear box 32. Slack take-up means for the belts 15 are provided by a roller 35 which is carried by a pair of bell crank levers 36 pivoted to the longitudinal frame members 13. Spring members 37 are secured at one end to the frame members 13 and at the other end to the bell crank members to urge the roller 35 upwardly and into contact with the belts 15.

Means are provided for cooperating with the conveyor belts to properly orient or align the pineapples on the belts with the major axes of the fruit extending generally parallel to the direction of travel of the upper runs of the belts. As shown in the drawings, these means may include a central plate or partition member 40 extending between the two pairs of conveyor belts 15 and consisting of plate portions 41 inclined downwardly from the center of the plate member, each secured to the transverse frame members 12 on the forward half of the assembly 11 by means of brackets 43. As will be seen in FIGURE 1, the plate member extends longitudinally from the forward end of the assembly 11 to a position approximately centrally between the forward and rearward ends thereof, and transversely to positions just short of the inner portions of the track members 14.

The orienting or aligning means also includes a pair of substantially vertical partition members 45 secured by bracket members 46 to the transverse frame members 12. The members 45 are of the same length as and are transversely aligned with the member 40, being transversely adjustably spaced outwardly from the two conveyor tracks 14 by means of nut and bolt assemblies 47 which extend through holes in the bracket members and through slotted openings 48 in the frame members 12. The members 45 extend above the tops of the belts 15 a substantial distance.

The space between the pair of track members 14 to the rear of the plate member 40 is open and immediately to the rear of the plate member is a chute assembly including a pair of chute members 50 open at the top and bottom and having generally vertical side and end walls 51 and 52. The members 50 are suitably secured to the longitudinal frame members 13 outwardly of each of the pairs of belts 15, extending both above and below the upper and lower runs of the belts. The chute assembly also includes a central chute member 53 extending between the pairs of belts 15 and having vertical end walls 54 and slightly inwardly sloping side walls 55.

Positioned directly below the open bottoms of the chute members is a belt conveyor 56, which extends in a transverse direction with respect to the assembly 11, for the purpose of receiving over-run fruit discharged through the hoppers.

Figure 6:
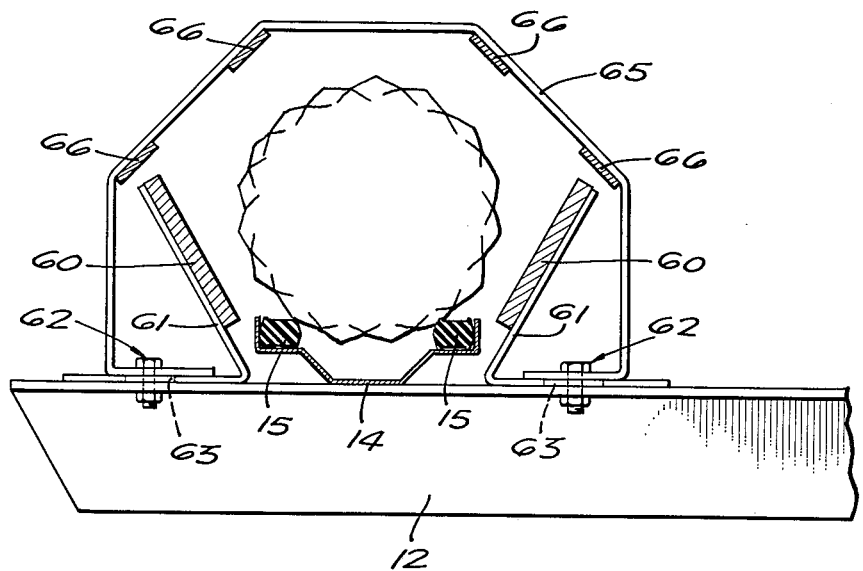
FIGURE 6 is a sectional elevation taken substantially on the line 6—6 of FIGURE 2, but illustrating the fruit in the properly aligned position.

The rearward portion of the assembly 11 includes two pairs of upwardly and outwardly inclined guide plates 60, one plate on either side of both pairs of belts 15. The plates are secured to bracket members 61 transversely adjustably mounted on the rearward frame members 12 by means of nut and bolt assemblies 62 which extend through slots 63 in the bracket members and holes in the transverse frame members 12. A guard cage structure is formed by means of a plurality of transverse members 65 suitably shaped, as shown best in FIGURE 6, to extend over the belts 15 and the fruit contained thereon, and a plurality of longitudinal bar members 66 secured to the members 65.

Additional orienting means are provided by a plurality of pairs of knock-over members 70 positioned between each pair of belts 15, one pair of members 70 being located just forward of the chute members 50 and 53, and additional pairs being positioned in the rearward portion of the assembly 11. These members each include a pair of upstanding arms 68 spaced inwardly from each belt 15 and extending upwardly to points intermediate the planes of the top and bottom surfaces of the belts.

The juice extracting portion of the apparatus is generally indicated 80 and includes a pair of counter-rotating drums 81 and 82 having fruit-engaging pins 73 and spikes 74 extending completely over the surfaces thereof. The drums are driven by means of a motor (not shown) and a chain power transmission assembly (not shown).

Cooperating with the drum 82 is an articulated grid mechanism generally indicated 83 and comprising a plurality of individual grid sections each including a grid plate 84 having a plurality of elongated openings 85 therein, the plates being curved to conform substantially to the peripheral contour of the drum 82 and convergently spaced therefrom so that fruit halves conveyed therebetween are gradually compressed and flattened. The trailing edges 85a of the openings 85 are rounded as shown in FIGURE 10. Each plate is supported by a casting 84a pivotally connected to a frame member 87 by means of a pivot shaft 88, and a pair of power cylinder assemblies 89 is provided to permit the grid mechanism including the member 87 to be swung downwardly and away from the drum for cleaning and maintenance purposes. Each of the power cylinder assemblies is pivoted at the lower end to a leg member 10 and at the upper end to a pivot shaft 90 carried on a casting 91 which is rigidly connected to the frame member 87 and pivoted on the drum shaft 81a. The casting 91 is operably connected to the castings 84a and their grid plates 84 in the manner described below.

The leading edges of the grid plates are provided with solid extension plates 86 which extend to a position just short of the surface of the drum 81, the plates being provided with end openings permitting the passage of the spikes 74.

Means are provided for resiliently urging the free ends of each of the grid plates in a direction towards the drum 82 and, as shown in the drawings, these means may include a plurality of air cylinder assemblies 93, one for each of the grid plates. The air cylinders are pivoted at their lower ends to a pivot shaft 94 carried on the casting 91 and at their upper ends to pivot pins 95 each carried on a clevis 96 secured to each of the grid plate castings 84a, thus forming an operative connection between the casting 91 and the castings 84a. The air cylinder assemblies 93 are provided with adjustable stop means (not shown) for limiting the minimum spacing between the grid plates and the drum 82.

Secured to the extractor frame is an excess juice-collecting trough 100 which extends across the outer surface of the drum 82 in close proximity thereto, the trough being provided with a rubber-faced wiper blade (not shown) which contacts the drum surface, the blade being split to permit the passage of the pins 73. A brass stripper blade 100a extends downwardly from the lower surface of the trough 100 into close proximity to the drum 82 to remove adhering peel or leaves.

Also secured to the extractor frame immediately adjacent the discharge end of the grid mechanism 83 is an auxiliary pulp recovery pan 100b provided with an open top in which is installed a grid structure to prevent entry of the peels, leaves and the like.

The extractor apparatus also includes a pair of circular saws 110 mounted for rotation on a shaft 111 suitably driven by power means (not shown). It will be seen that the saws are mounted above the drum 82 and extend between each pair of belts 15. The saws are provided with guard housings 112 which cooperate with the guard cage to protect against injury to operators of the apparatus.

Cooperating with each of the saws 110 for delivery of the cut pineapple halves into the bite between the drums 81 and 82 is a pair of curved divider plates 115. The plates each include a smooth surface 116 of compound curvature extending from a front edge 117 which is generally vertical and lies parallel to and closely adjacent the side of the saw to a horizontal trailing edge 118 parallel to and spaced above the bite between the drums 81 and 82. Integral with each side of the plates 115 is a side wall 120 which prevents the pineapple halves from being forced out of the desired paths across the faces of the plates 115. A bottom plate member 121 of a curvature generally similar to that of the plates 115 is spaced from each of said plates to guide fruit halves not following the normal path of travel across the faces of the plates 115.

Figure 5:
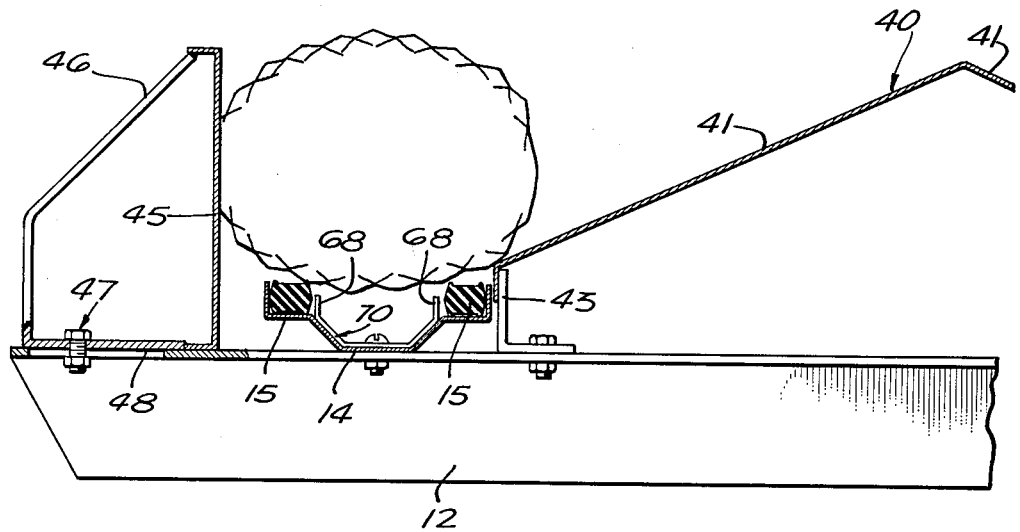
FIGURE 5 is a sectional elevation taken substantially on the line 5—5 of FIGURE 2, illustrating a fruit in a mis-aligned position.

In operation of the apparatus, the whole pineapples are fed, either by hand or mechanically, as from a conveyor or chute (not shown), onto the belts 15 at the front ends thereof. The plate member 40 functions as a ramp, so that fruit improperly delivered to the belts rolls in both directions onto the two pairs of belts 15. As indicated in the drawings, the pineapple is a generally elongated fruit and it is necessary, for the best operation of the extractor to introduce the fruit therewith with the long axis of the fruit extending generally in the direction of the feed. This is accomplished automatically by the assembly 11. Thus, many of the fruit naturally roll down the plate portions 41, the rotation being about their long axes, and these fruit come to rest upon the pair of belts 15 in the desired oriented position illustrated in FIGURES 6 and 9. In some cases fruit comes to rest as in FIGURE 5, with the long axis perpendicular to or otherwise non-parallel to the belts 15. In such case, as shown in FIGURE 5, the forward portion of the fruit will contact the partition member 45 and the belt 15 remote from the plate portion 41, but will be spaced from the other belt by reason of the fact that the lowest part of the plate portion 41 is above the belt. The left-most portion of the fruit (as seen in FIGURE 5) will then be moved forwardly, causing the fruit to be virtually pivoted about its contact point with the plate portion 41, until the movement is sufficient to have rotated the fruit and to permit it to roll onto the belts 15 in the properly aligned position. It will be noted that the belts 15 are generally hexagonal in cross-section and that the upper innermost sides of the belts serve to support the pineapples and hold them in the oriented position.

In the event that a fruit is deposited upon the belts 15 with its long axis substantially perpendicular to the direction of belt travel, as shown in FIGURES 5a and 9, the fruit will be conveyed in this manner until it strikes one of the knock-over members 70. Then, as shown in FIGURE 9, the impetus of the bulk of the fruit will cause it to be thrown forwardly, essentially pivoting about its point of contact with arms 68, to the aligned position shown.

Over-run fruit, i.e., fruit that is piled up on another fruit being conveyed or fruit that is completely mis-aligned will fall or be knocked off the belts 15 when they reach the chutes 50 and 53, falling therethrough onto the conveyor 56 from whence they are reconveyed to the apparatus.

It will be noted from an inspection of FIGURE 1 that the outward guide plate 60 of each pair of plates is longer than the inward plate 60, the outward plates 60 extending partially above the chute assembly. This differential in length serves as an aligning means. Should fruit fail to align before arriving at the chutes 50 and 53, the longer guide plate 60 will retard the overhanging end of the fruit rotating it so that it is properly aligned on the belts 15. Should the fruit overhang with a portion thereof extending inwardly of the belts 15, the shorter plate 60 will perform a similar function. The location of the forward ends of the plates 60 also facilitates the removal of fruit which might be doubled on the belts 15, such doubled fruit being knocked off into the chutes 50 and 53 by these ends.

The properly aligned pineapples on the belts 15 are conveyed thereby into contact with the saws 110 whereby they are halved, or substantially halved. The combined driving action of the belts and the saws propels the cut halves onto the divider plates 115 whereupon they slide across the smooth surfaces 116 by virtue of their momentum, assisted by gravity, to be thereby fed into the bite between the drums 81 and 82. The spikes 74 contact the cut face of each pineapple, forcing it into the converging passage between the grid and the drum 82. At the same time the pins 73 contact the thorny skin or peel of the pineapple, the rotation of the drum moving the pineapple through the passage, substantially flattening the fruit half and pressing the juice therefrom. Portions of the fruit pulp extend through the openings in the grid and are pressed against the rounded-off trailing edges 85a of the grid openings by the relative movement, thus resulting in the recovery of additional juice and pulp. The rounded trailing edges perform two functions: (1) they prevent the pulp from building up and plugging the grid openings, and (2) they avoid any cutting of the "eyes" of the pineapple, the disadvantages of which are explained in detail hereinafter. The juice falls by gravity through the openings, into the collection pan 130 and out the drain pipe 131 for collection and further processing. The juice requires only a simple finishing operation prior to packaging.

It will be understood that since the machine preferably (although not essentially) operates simultaneously upon two lines of whole fruit, the drum and grid extraction mechanism must be capable of simultaneously operating upon at least four fruit halves. However, due to the varying sizes of whole fruit and the fact that it is impossible to exactly halve each fruit, fruit halves or pieces of varying sizes must be accommodated in the converging passage, and this presents a problem in the application of uniform pressure upon the fruit. The peculiarly hard nature of the pineapple peel renders the problem doubly difficult. However, the articulated grid sections, which are each resiliently urged in the direction of the drum, have been found in actual use of the apparatus to solve these problems in an excellent manner.

The fruit peel is discharged from the exit end of the converging passage. The function of the auxiliary pulp recovery pan 100b is to recover any loose pieces of pulp which would otherwise be discharged with the peel. The grid on the pan permits the pieces of pulp to fall into the pan, whereas large leaves and the main portions of the peel are conveyed away, across the top of the grid structure. The surface of the drum 82 is continuously wiped clean by the wiper blade and any residual juice delivered thereby into the juice trough 100. This juice may be discarded or diverted to by-product uses since it is contaminated with dirt from the outer surface of the pineapple skins.

The apparatus of the present invention provides for high yield of pineapple juice with the maintenance of top quality juice. A device known as an eradicator, heretofore in use, employs a knife and with this machine the "eyes" of the pineapple fruit are frequently cut. These eyes are the old blossoms which have closed over after flowering. Due to the nature of the soil in which the pineapple is grown, the flowers frequently take on soil and dust which is transmitted to the juice when the eradicator knife cuts open the eye. The eye is also a source of bacterial contamination. Utilizing the present invention the eye is not ruptured, yet the juice bearing pulp between the eyes is removed. This is accounted for by the fact that the eyes are located in somewhat thinner areas of the peel and during the pressing action the eyes are moved away from the grid in a direction towards the driving drum. This results in the production of greater quantities of juice material than are possible with the eradicator knife apparatus, yet without opening up the eyes with the resultant contamination of the juice.

The apparatus of the present invention is also superior to the eradicator knife apparatus in that the eradicator knife, if set for high yield, frequently cuts into the outer green layer of the skin, releasing an oil which oxidizes in later processing, resulting in objectionable flavors in the final product. Such objections are not present in the apparatus of this invention.

The apparatus of the present invention is particularly well suited to the high efficiency processing of small pineapples. This becomes particularly important when it is understood that the presently utilized coring and slicing machinery for the production of sliced fruit is very inefficient when used on the small sized fruit, requiring much hand labor for the preparation of sliced pineapple from fruit of sub-standard size. The apparatus of the present invention is capable of obtaining juice yields from such small fruit comparable to the yields obtained by the most efficient of the coring and slicing machines when used on larger fruit.

Orientation of the fruit in accordance with the present invention is an important feature thereof when the apparatus is utilized on the normal run of pineapples wherein the fruit has a long axis. For example, if a typical pineapple roughly 4″ in diameter and 6″ long is cut on the long axis the thickest part would be 2″, whereas if it is cut on the short axis the thickest part would be 3″. Cutting to provide the thinner section is advantageous in that the thinner sections more easily enter the bite between the drums 81 and 82 and they require less flattening to completely extract the juice. Cutting along the long axis also splits the relatively hard core of the fruit and facilitates the pressing of this portion. Orienting of the fruit in the manner described also permits the design of a more compact machine, since by orienting the fruit so that it enters the drums in the manner described, the drums can be designed to be of considerably less width than if the fruit entered the drums in a manner such that the long axis of the fruit were substantially parallel to the axes of the drums.

Having fully described my invention, it is to be understood that I do not wish to be limited to the details set forth, but my invention is of the full scope of the appended claims.

I claim:

1. In apparatus for extracting pineapple juice, the combination of a rotating drum, a grid having a curved surface conforming generally to the surface of said drum, said grid being convergently spaced from said drum to provide a convergent passage therebetween and said grid comprising a plurality of grid sections, each section being individually resiliently urged in the direction of said drum, means for feeding cut fruit into the passage with the cut face thereof in contact with said grid, and means for moving said fruit through said converging passage to flatten the same and express the juice therefrom.

2. The apparatus of claim 1 wherein an air cylinder assembly is operably connected to each grid section to resiliently urge each individual grid section in the direction of the drum.

3. A conveying and orienting apparatus for pineapples comprising the combination of a pair of generally horizontal, spaced moving belts, the spacing therebetween being less than the minimum diameter of said fruit, a stationary inclined ramp member on one side of said belts down which fruit may be rolled to be deposited on said belts, the bottom of said ramp member being elevated above the top of said belts, a substantially vertical partition member extending parallel to said belts and being adjacent thereto on the other side thereof, said partition member adapted to contact mis-aligned fruit on said belts, and a knock-over member positioned between said belts, said member including a portion extending to a point just below the level of the top of said belts in a position to contact mis-aligned fruit.

4. Apparatus for extracting pineapple juice comprising the combination of means for conveying whole pineapple fruit, means for aligning said fruit with the long axes thereof extending generally parallel to the direction of travel thereof, means for cutting said fruit while being so conveyed, and means for extracting the juice from the cut fruit, said extracting means including a rotating drum, and a grid having a curved surface conforming to the surface of said drum, said grid being convergently spaced from said drum to provide a convergent passage therebetween for movement of the fruit therethrough to flatten the same and express the juice therefrom and said grid being composed of a plurality of grid sections, each section being individually resiliently urged in the direction of the drum.

5. The apparatus of claim 4 wherein an air cylinder assembly is operably connected to each grid section to resiliently urge each individual grid section in the direction of the drum.

6. Apparatus for extracting pineapple juice comprising the combination of means for conveying whole pineapple fruit; means for aligning said fruit with the long axes thereof extending generally parallel to the direction of travel thereof, said means for conveying and said means for aligning the fruit including a pair of generally horizontal, spaced moving belts, the spacing therebetween being less than the minimum diameter of said fruit, a stationary inclined ramp member on one side of said belts down which fruit may be rolled to be deposited on said belts, the bottom of said ramp member being elevated above the top of said belts, a substantially vertical partition member extending parallel to said belts and being adjacent thereto on the other side thereof, said partition member being laterally adjustable and adapted to contact mis-aligned fruit on said belts, and a knock-over member positioned between said belts, said member including a portion extending to a point just below the level of the top of said belts in a position to contact mis-aligned fruit; means for cutting said fruit while being so conveyed; and means for extracting the juice from the cut fruit.

References Cited in the file of this patent

UNITED STATES PATENTS

| | | |
|---|---|---|
| 4,682 | Stillman | Aug. 8, 1846 |
| 1,060,247 | Ginaca | Apr. 29, 1913 |
| 2,242,532 | Marx | May 20, 1941 |
| 2,334,783 | McKinnis | Nov. 23, 1943 |
| 2,350,603 | Fry | June 6, 1944 |
| 2,581,634 | Coons | Jan. 8, 1952 |
| 2,604,034 | Hess | July 22, 1952 |
| 2,652,915 | Fox | Sept. 22, 1953 |
| 2,767,645 | Bireley | Oct. 23, 1956 |
| 2,915,005 | Hetzler | Dec. 1, 1959 |